July 19, 1955 G. E. READ 2,713,474
APPARATUS FOR MAKING REFRIGERATED COMESTIBLES
Filed March 29, 1952

INVENTOR.
GEORGE E. READ
BY Lyon & Lyon
ATTORNEYS

United States Patent Office 2,713,474
Patented July 19, 1955

2,713,474

APPARATUS FOR MAKING REFRIGERATED COMESTIBLES

George E. Read, Santa Monica, Calif., assignor to Insta-Freeze Corporation, San Francisco, Calif., a corporation of California Application March 29, 1952, Serial No. 279,270

5 Claims. (Cl. 259—43)

My invention relates to apparatus for making refrigerated comestibles and is a continuation-in-part of my copending application, Serial No. 184,144, filed September 11, 1950, now Patent No. 2,646,974 granted July 28, 1953. Included in the objects of my invention are:

First, to provide an apparatus of this class which produces within seconds a serving of a frozen comestible made from fruit juice, syrup, milk, cream or mixtures thereof and in particular, is preeminently suitable for the preparation of "milk shakes" or "malted milk shakes."

Second, to provide an apparatus of this class wherein each serving is so completely discharged that servings of different flavors or mixtures may be prepared in rapid succession without one flavor or mixture contaminating or influencing the succeeding serving of a different flavor, color or mixture.

Third, to provide an apparatus of this class which employs a vertical cylinder, the walls of which are supercooled and which incorporates a novel beater and cutter assembly to remove the frozen flakes of material from the walls of the cylinder, this being accomplished without actual scraping contact with the walls so that metal-to-metal contact and attendant wear and noise is avoided.

Fourth, to provide an apparatus of this class, a novel beater and cutter assembly wherein sets of relatively heavy, rigid blades or bars are pivotally mounted on vertical shafts located symmetrically about a central main shaft, the bars being maintained in their radially extended operating position by centrifugal force, and each blade being independently yieldable about its pivotal axis so that as the bars encounter abnormal irregularities in the frozen coating of material, they may yield but immediately return automatically to their normal radial position.

Fifth, to provide a novel beater and cutter assembly in which the cutting blades or bars are provided with special cutting edges and downwardly deflecting channels adjacent the cutting edges to deflect the frozen particles or flakes downwardly as they are cut free from the surface of the chilling cylinder.

With the above and other objects in view as may appear hereinafter, reference is directed to the accompanying drawings in which.

Figure 1:
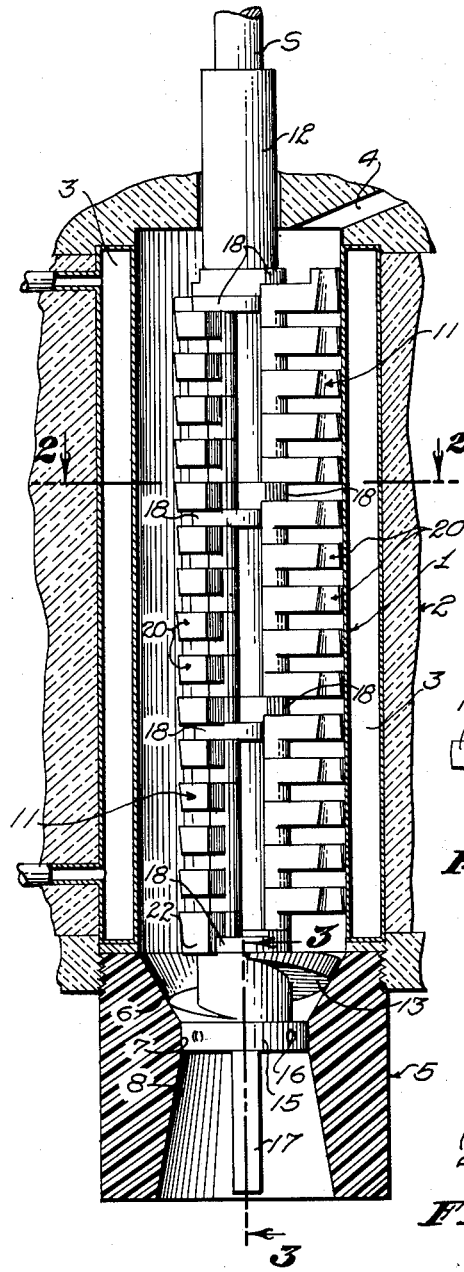
Figure 1 is a fragmentary vertical sectional view through a freezing cylinder showing my beater and cutter assembly mounted thereon.
Figure 2:
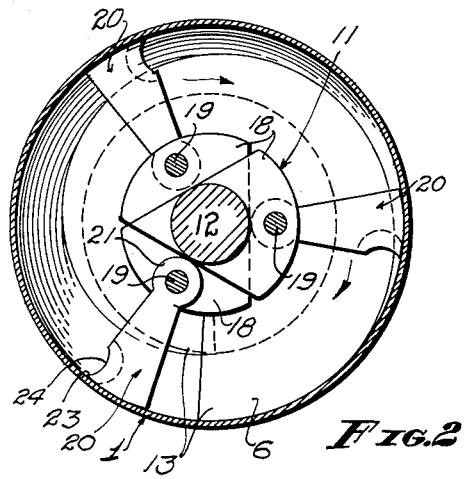
Figure 2 is a transverse sectional view through 2—2 of Figure 1.
Figures 3, 4:
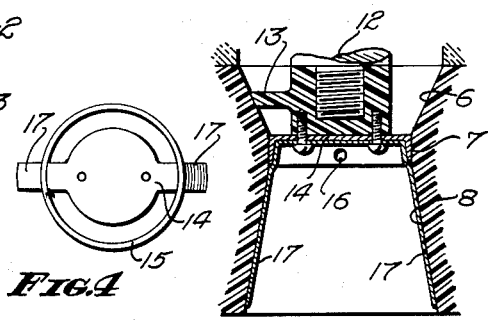
Figure 3 is a fragmentary longitudinal sectional view through 3—3 of Figure 1.
Figure 4 is a plan view of the lower bearing and wiper blades.

A freezing or chilling cylinder 1 is provided which is preferably arranged vertically within a suitable insulating housing 2, shown fragmentarily. The cylinder is provided with a jacket 3 through which circulates a suitable refrigerant. The housing is provided with a delivery passage 4 intersecting the upper end of the cylinder 1. Fitted in the lower end of the housing 2 is a discharge nozzle 5 disposed coaxially with the cylinder 1. The discharge nozzle is preferably formed of plastic material, such as nylon. The bore through the nozzle comprises an upper converging portion 6, a cylindrical bearing portion 7 and a slightly diverging lower portion 8.

The chilling cylinder 1 is adapted to receive a beater and cutter assembly 11. This assembly includes a central shaft 12 which is provided with a socket at its upper end for attachment to a shaft S of a motor, not shown, suitably mounted above the housing 2. The lower end of the main or central shaft 12 is provided with a packing helix 13. The packing helix is preferably formed of plastic, such as nylon, and comprises a central hub and a single helical blade, the periphery of which conforms to the converging upper portion 6 of the nozzle 5.

Secured to the underside of the packing helix 13 by means of a diametrically extending web 14 is a bearing ring 15, preferably formed of metal. The bearing ring seats within the cylindrical bearing portion 7 of the nozzle and is preferably provided with one or more perforations 16. Secured to the bearing ring 15 is a pair of depending wiper blades 17 which conform to the diverging lower portion of the nozzle.

The central or main shaft 12 is provided with integral bearing segments 18, located at the top and the bottom as well as intermediate the ends of the shaft. The bearing segments are arranged in sets of three, the members of each set being staggered axially. Threaded through each row of bearing segments is a pivot shaft 19. Three such shafts are shown arranged symmetrically about the main shaft 12. Each of the pivot shafts 19 receives a plurality of beater bars 20. Each beater bar is in a form of a segment. That is, it diverges outwardly from the pivot shaft. The pivoted end of each beater bar is provided with an integral collar 21 which extends axially so that when a series of the beater bars are stacked on a pivot shaft, the extremities of the beater bars are in proper axially spaced relationship.

As will be observed from Figure 1, the beater bars on one shaft are displaced axially from the beater bars on the other. The extreme upper and lower beater bars may have axial extensions 22 at their extremities.

The radial extremity of each beater bar is arcuate and terminates just short of actual contact with the inner surface of the chilling cylinder so that on rotation, the beater bars do not bear against or scrape the walls of the cylinder. The leading vertical edge of each beater bar extremity is sharpened to form a cutter blade 23. Inwardly of this cutter bar or edge, the side of the beater bar is relieved to form a deflector channel 24. The cutter blade and channel slope downwardly.

Operation of my apparatus for making refrigerated comestibles is as follows:

The liquid mixture which may comprise fruit juice or syrup and milk or other liquid foodstuff is introduced into the upper end of the chilling cylinder 1 while the beater and cutter assembly is rotating. The beater blades atomize and mix the liquid material and discharge the material radially against the walls of the chilling cylinder. The walls of the chilling cylinder are maintained from 10° to 30° below zero so that the material quickly freezes, However, the bars on rotating, cut this material free of the cylinder and immediately redeposit the material on the walls of the cylinder. This action is repeated as the material descends through the cylinder. By the time the material reaches the lower end of the cylinder, it is thoroughly frozen and it is in the form of relatively loose unconsolidated particles which become partially packed as they are forced downwardly by the packing helix 13. The frozen material issues through the bearing ring 15 and is collected in a container placed below the nozzle 5.

My apparatus is particularly suitable for the preparation of "milk shakes" or "malted milk shakes." The liquid ingredients pass through the cylinder in approximately eight seconds so that a serving can be prepared at a minimum of time. Although the beater bars do not scrape against the chilling cylinder, nevertheless, the material is so thoroughly cleaned from the cylinder that it is possible to introduce one serving immediately after another without cleaning the cylinder. This is true even though the flavors differ. For example, a chocolate serving may be followed by a vanilla serving without one flavor or color contaminating the other.

Figure 6:
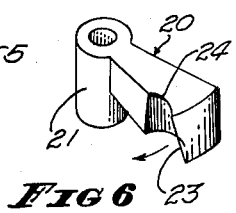
Figure 6 is a fragmentary transverse sectional view, similar to Figure 2, illustrating the mode of operation of the beater and cutter bars.
Figure 5:
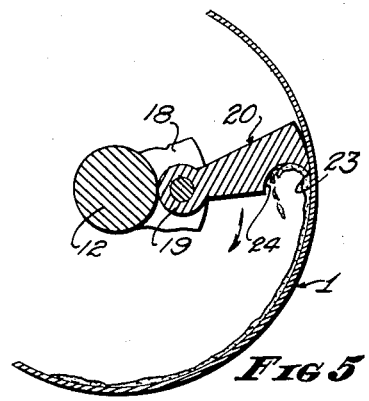
Figure 5 is a perspective view of one of the cutter bars.

The material is not deposited uniformly on the walls of the chilling cylinder. Thus, the force required to remove the material varies. If an abnormally large deposit occurs, the beater bars on encountering the added resistance, may displace backwardly relative to the direction of travel as indicated in Figure 6. It will be noted that by reason of the arcuate form extremity of the beater bar, its cutting edge remains in close proximity to the walls of the cylinder even though the bar may be displaced backwardly a substantial amount. As soon as obstruction is removed, each beater bar returns to its normal radial position. By reason of the fact that the extremities of the bars are relatively large, the centrifugal force, which maintains them in the radial position, is substantial and the stored energy is also substantial so that even though the deposit of the material may be irregular, the corresponding change in resistance to movement of the beater bars is absorbed by the stored energy in the beater bars, rather than being transmitted to the drive shaft. The result is that vibration of the shaft is reduced to a minimum.

The bearing ring 15 plays an important part to enable the assembly to run true and prevent the cutters from striking the walls of the cylinder. The bearing ring is lubricated by the material passing through, this being aided by the perforations 16.

It will be observed that the entire assembly may be removed by removing the nozzle 5 and that when removed, the pivot shafts 19 may be withdrawn from their bearings 18 so that the cutter and beater bars 20 may be disassembled for cleaning.

Having fully described my invention, it is to be understood that I do not wish to be limited to the details herein set forth, but my invention is of the full scope of the appended claims.

I claim:

1. A beater and cutter assembly adapted for removing frozen comestible material from the cylindrical walls of a freezing chamber, comprising: a central rotatable main shaft; parallel pivot shafts arranged symmetrically around the axis of the main shaft and rotatable therewith; a plurality of segmental beater bars journaled on said pivot shafts said bars increasing in width and mass toward their free extremities and tending on rotation of said main shaft to extend radially therefrom; and cutter blades along the leading edges of the extremities of said beater bars; the extremities of said beater bars being relieved back of said cutter blades and said cutter blades being disposed in proximity to but clearing said cylindrical walls, whereby on starting of said shaft and on encountering excessive accumulation on said walls said beater bars are pivotal backward relative to the direction of rotation thereby swinging clear of and away from said cylindrical walls.

2. An apparatus for producing frozen comestibles, comprising: a freezing cylinder having means at one end to receive liquid comestible mixture and means at the other end for discharge of said mixture; a rotatable main shaft extending centrally through said cylinder; a bearing ring for supporting and journaling an end of said main shaft in said discharge means, said bearing ring being lubricated by material discharging from said cylinder; a plurality of radiating beater bars arranged in rows extending longitudinally of said main shaft and capable of limited pivotal movement about axes parallel to said main shaft, said beater bar extending to the walls of said cylinder and having cutting edges positioned to cut frozen material from said wall as said main shaft and beater bars are rotated; the extremities of said beater bars being relieved back of said cutting edges, said cutting edges being disposed in proximity to but clearing said cylinder, whereby on starting of said shaft and on encountering excessive accumulation on said walls said beater bars are pivotal backward relative to the direction of rotation thereby swinging clear of and away from said cylinder.

3. An apparatus for producing frozen comestibles, comprising: a freezing cylinder having means at one end to receive a liquid comestible mixture and means at the other end for discharge of said mixture; a rotatable main shaft extending centrally through said cylinder; a bearing ring for supporting and journaling an end of said main shaft in said discharge means, said bearing ring being lubricated by material discharging from said cylinder; pivot shafts arranged symmetrically around said main shaft; a plurality of beater bars mounted for limited pivotal movement about said pivot shafts, said beater bars diverging toward their extremities and tending by their mass to extend radially on rotation of said main shaft; and cutting blades along the leading edges of said bars adapted to cut free from said wall accumulations of a frozen comestible mixture; the extremities of said beater bars constituting cylindrical sections having their centers coinciding with the pivotal axes of said beater bars and disposed in proximity to but clearing said cylinder, whereby on starting of said shaft and on encountering excessive accumulation on said walls said beater bars are pivotal backward relative to the direction of rotation thereby swinging clear of and away from said cylinder.

4. An apparatus for producing frozen comestibles, comprising: a vertically disposed freezing cylinder adapted to receive a liquid comestible mixture at its upper end and discharge frozen comestible material from its lower end; a rotatable main shaft centered in said cylinder and a plurality of radiating beater bars arranged symmetrically in rows extending longitudinally of said main shaft and capable of limited pivotal movement about axes parallel to said main shaft, said beater bars extending to the walls of said cylinder and having downwardly and forwardly directed cutting edges and deflecting surfaces at their leading edges to remove accumulation of frozen comestible mixture from the walls of said cylinder and direct said mixture toward the discharge end of said cylinder; the extremities of said beater bars constituting cylindrical sections having their centers coinciding with the pivotal axes of said beater bars and disposed in proximity to but clearing said cylinder, whereby on starting of said shaft and on encountering excessive accumulation on said walls said beater bars are pivotal backward relative to the direction of rotation thereby swinging clear of and away from said cylinder.

5. In an apparatus for producing frozen comestibles, having a cylindrical freezing chamber, the walls of which are maintained at subfreezing temperature, the combination of a beater and cutter assembly comprising: a rotatable central shaft; several pivot shafts carried by said central shaft and disposed parallel to the axis thereof and equidistant therefrom for rotation about the axis of said central shaft; and a plurality of beater and cutter bars mounted on each of said pivot shafts for independent pivotal movement about the axis of said pivot shaft as well as rotation about the axis of said central shaft; the mass of each bar increasing toward its extremity and the leading side of said bar adjacent its extremity being concave and terminating in a leading cutting edge; each of said bars, when positioned radially in a plane passing through said central shaft and its pivot shaft, extending into close proximity to but clearing the walls of said freezing chamber.

References Cited in the file of this patent

UNITED STATES PATENTS

| | | |
|---|---|---|
| 660,251 | Gray | Oct. 23, 1900 |
| 1,109,143 | Perkins | Sept. 1, 1914 |
| 1,369,053 | Scott | Feb. 22, 1921 |
| 2,272,715 | Lindsey | Feb. 10, 1942 |
| 2,304,579 | Lindsey | Dec. 8, 1942 |